(12) United States Patent
Buer et al.

(10) Patent No.: US 9,910,990 B2
(45) Date of Patent: *Mar. 6, 2018

(54) SECURITY CONTROLLED MULTI-PROCESSOR SYSTEM

(71) Applicant: NXP B.V., Eindhoven (NL)

(72) Inventors: Mark L. Buer, Payson, AZ (US); Jacob Mendel, Tel Aviv (IL)

(73) Assignee: NXP B.V., Eindhoven (NL)

( * ) Notice: Subject to any disclaimer, the term of this patent is extended or adjusted under 35 U.S.C. 154(b) by 156 days.

This patent is subject to a terminal disclaimer.

(21) Appl. No.: 14/985,697

(22) Filed: Dec. 31, 2015

(65) Prior Publication Data
US 2016/0117506 A1  Apr. 28, 2016

Related U.S. Application Data

(63) Continuation of application No. 13/491,309, filed on Jun. 7, 2012, now Pat. No. 9,256,734.

(60) Provisional application No. 61/639,394, filed on Apr. 27, 2012.

(51) Int. Cl.
| | |
|---|---|
| *G06F 21/00* | (2013.01) |
| *G06F 21/57* | (2013.01) |
| *G06F 21/53* | (2013.01) |
| *G06F 21/56* | (2013.01) |
| *G06F 21/85* | (2013.01) |
| *G06F 17/00* | (2006.01) |
| *H04L 29/06* | (2006.01) |

(52) U.S. Cl.
CPC ........... *G06F 21/57* (2013.01); *G06F 21/53* (2013.01); *G06F 21/567* (2013.01); *G06F 21/85* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 6,092,202 A * | 7/2000 | Veil | ........................ | G06F 21/34 705/64 |
| 6,199,167 B1 * | 3/2001 | Heinrich | ............. | G06F 13/4027 380/255 |
| 7,290,284 B1 * | 10/2007 | Wettergren | ......... | G06F 21/6218 711/163 |

(Continued)

OTHER PUBLICATIONS

Non-Final Office Action dated Oct. 3, 2013 for U.S. Appl. No. 13/491,309, filed Jun. 7, 2012; 13 pages.

(Continued)

*Primary Examiner* — Eric Chen

(57) ABSTRACT

Embodiments of the present disclosure provide systems and methods for implementing a secure processing system having a first processor that is certified as a secure processor. The first processor only executes certified and/or secure code. An isolated second processor executes non-secure (e.g., non-certified) code within a sandbox. The boundaries of the sandbox are enforced (e.g., using a hardware boundary and/or encryption techniques) such that code executing within the sandbox cannot access secure elements of the secure processing system located outside the sandbox. The first processor manages the memory space and the applications that are permitted to run on the second processor.

16 Claims, 3 Drawing Sheets

(56) References Cited

U.S. PATENT DOCUMENTS

| | | | |
|---|---|---|---|
| 8,931,042 B1* | 1/2015 | Weiss | G06F 15/16 |
| | | | 726/1 |
| 9,256,734 B2 | 2/2016 | Buer et al. | |
| 2006/0143446 A1* | 6/2006 | Frank | G06F 21/57 |
| | | | 713/164 |
| 2007/0223689 A1* | 9/2007 | O'Brien | G06F 21/53 |
| | | | 380/30 |
| 2008/0189707 A1* | 8/2008 | Ibrahim | G06F 9/4881 |
| | | | 718/102 |
| 2009/0063835 A1* | 3/2009 | Yao | G06F 12/1491 |
| | | | 713/2 |
| 2009/0138623 A1* | 5/2009 | Bosch | G06F 21/74 |
| | | | 710/14 |
| 2009/0172329 A1* | 7/2009 | Paver | G06F 12/1491 |
| | | | 711/163 |
| 2010/0293357 A1* | 11/2010 | Park | G06F 21/74 |
| | | | 712/205 |
| 2011/0047613 A1 | 2/2011 | Walsh | |
| 2011/0154431 A1* | 6/2011 | Walsh | G06F 21/53 |
| | | | 726/1 |
| 2011/0191599 A1* | 8/2011 | Chou | G06F 21/72 |
| | | | 713/193 |
| 2011/0280402 A1* | 11/2011 | Ibrahim | G06F 21/572 |
| | | | 380/277 |
| 2011/0296157 A1 | 12/2011 | Konetski et al. | |
| 2012/0117381 A1* | 5/2012 | Lo | G06F 8/63 |
| | | | 713/156 |
| 2012/0117614 A1* | 5/2012 | Sahita | G06F 12/1491 |
| | | | 726/1 |
| 2013/0291053 A1 | 10/2013 | Buer et al. | |
| 2014/0047229 A1* | 2/2014 | Wiseman | G06F 13/14 |
| | | | 713/2 |

OTHER PUBLICATIONS

Non-Final Office Action dated May 13, 2014 for U.S. Appl. No. 13/491,309, filed Jun. 7, 2012; 12 pages.
Final Office Action dated Aug. 19, 2014 for U.S. Appl. No. 13/491,309, filed Jun. 7, 2012; 14 pages.
Notice of Allowance dated Aug. 12, 2015 for U.S. Appl. No. 13/491,309, filed Jun. 7, 2012; 14 pages.
Notice of Allowance dated Oct. 9, 2015 for U.S. Appl. No. 13/491,309, filed Jun. 7, 2012; 7 pages.

* cited by examiner

US 9,910,990 B2

SECURITY CONTROLLED MULTI-PROCESSOR SYSTEM

CROSS REFERENCE TO RELATED APPLICATIONS

This patent application is a continuation of U.S. patent application Ser. No. 13/491,309, filed Jun. 7, 2012, which claims the benefit of U.S. Provisional Patent Application No. 61/639,394, filed on Apr. 27, 2012, each of which is incorporated by reference herein in its entirety.

FIELD OF THE INVENTION

This invention relates to computer security and more specifically to secure, processing systems.

BACKGROUND OF THE INVENTION

Security is a critical component of modern computer systems. Computer security systems and techniques ensure that valuable information and systems are not compromised by hackers or malicious software. To that end, many organizations publish security standards that vendors can use as guidelines for security of hardware and/or software. The Common Criteria for Information Technology Security Evaluation ("Common Criteria" or "CC") is a prominent standard currently used as a guide for the development, evaluation and/or procurement of IT products with security functionality.

The CC provides a common set of requirements for the security functionality of IT products and for assurance measures applied to these IT products during a security evaluation. The IT products may be implemented in hardware, firmware, or software. The evaluation process under the CC establishes a level of confidence that the security functionality of an IT product and the assurance measures applied to the IT product meet the defined set of requirements. Compliance with CC can be demonstrated to a national approval authority, such as the National Institute of Standards and Technology (NIST) National Voluntary Laboratory Accreditation Program (NVLAP) in the United States.

One common security requirement demanded by users is that only certified (or trusted) code be executed in the security domain of the system (e.g., secure processor). Previous approaches to achieve this requirement used a hardware mechanism to allow a single processor to operate logically as two processors. However, from a security perspective, this architecture requires that the security portion, of the device cannot operate simultaneously with the application processor. For high security applications, this architecture further does not allow the certified processor to respond to attempts to tamper with the system.

Furthermore, the difficulty in achieving this requirement is increased in multi-application environments. For example, secure (certified) applications (such as a certified financial application) must co-exist with customer written applets. Thus, any certification claim may become invalid once the customer written (untrusted) applet is added to the environment.

What is therefore needed are systems and methods that retain certification of security components of the system while allowing for the simultaneous execution in the system of untrusted code.

BRIEF DESCRIPTION OF THE DRAWINGS/FIGURES

The accompanying drawings, which are incorporated in and constitute part of the specification, illustrate embodiments of the invention and, together with the general description given above and the detailed descriptions of embodiments given below, serve to explain the principles of the present invention. In the drawings.

Figure 1:
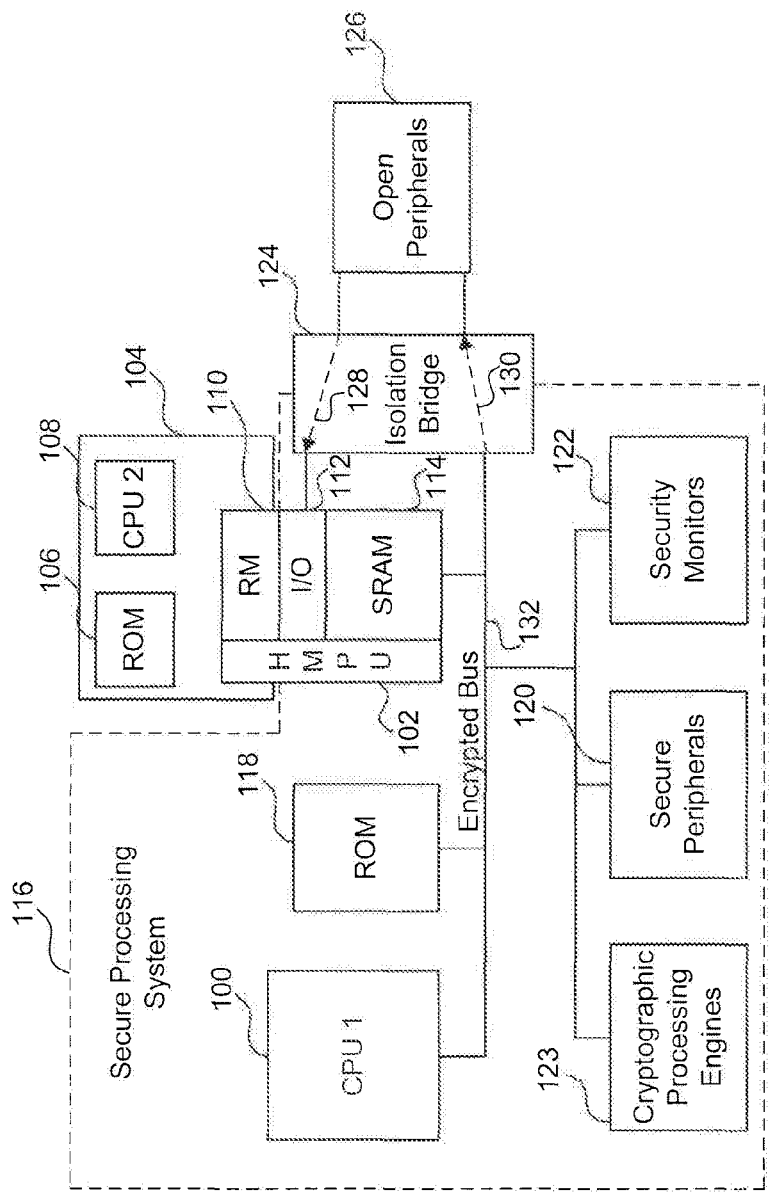
FIG. 1 is a block diagram of a system, according to an embodiment of the present disclosure, that incorporates a secure processing system and a non-secure sandbox for execution of untrusted code.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in, connection with, an embodiment, it is submitted that it is within the knowledge of one skilled in the art to affect such feature, structure, or characteristic in connection with other embodiments whether or not explicitly described.

1. Overview

Embodiments of the present disclosure provide systems and methods for implementing a secure processing system having a processor that may be certified as a secure processor and another isolated processor that supports a "sandbox" defined and mar aged by the secure processor for the execution of untrusted code. The sandbox isolates code (e.g., uncertified code and/or non-secure code) from accessing or viewing the secure processing system. The secure processor manages the memory space and the applications that are permitted to run on the second processor. Because the secure processing system only executes secure and/or certified code, the product/system implementing the secure processing system can retain a security certification for the secure processor. The isolated processor executes code within an isolated boundary (a "sandbox") defined by the secure processor. The secure processor defines the boundaries of the sandbox (e.g., using a hardware boundary or a logical security boundary) such that code executing within the sandbox cannot access secure elements of the secure processing system outside of the sandbox.

Thus, embodiments advantageously provide a secure processing system that includes a certified secure processor that only executes certified and/or secure code while allowing the execution of untrusted code in an isolated sandbox that is external to the secure processing system. Because a security boundary of the sandbox is enforced by the secure processor, untrusted code executing in the sandbox can be supported without compromising the security of the secure processing system.

2. Systems

FIG. 1 is a block diagram of a multiprocessor system, according to an embodiment of the present disclosure, that incorporates a secure processing system 116 and one or more non-secure components. In an embodiment, secure processing system 116 includes a secure processor 100, one or more cryptographic processing engines 123, one or more secure peripherals 120, security monitors 122, and a read only memory (ROM) 118. CPU1 100 is configured to execute only secure and/or certified code. CPU1 100 does not execute non-secure and/or uncertified code (e.g., custom code of a vendor or a user). Additionally, CPU1 1100 manages both the memory space and applications that are allowed to run on CPU2 108.

Secure processing system 116 has an associated security boundary. This security boundary helps to prevent non-secure code from accessing and/or tampering with the elements of secure processing system 116. The security boundary may be established, for example, using hardware and/or cryptographic techniques. Hardware techniques for providing a security boundary may include, for example, placing components within a single integrated circuit. In addition, one or more integrated circuits may be protected by a physical structure using tamper evident and/or tamper resistant techniques such as epoxy encapsulation. Encryption techniques for establishing a security boundary may include, for example, encrypting sensitive information before it leaves a component within secure processing system 116. For this purpose, secure processing system 116 includes one or more cryptographic processors and stores the associated encryption/decryption keys in a secure memory internal to secure processing system 116 (e.g., in ROM 118 or in a one-time programmable memory).

2.1 Sandbox

Many attacks on systems are achieved through including malicious code within software programs. For example, a hacker may insert code into a program to access secure information (e.g., passwords, keys, etc.) or to interfere with the operation of the system (e.g., a virus). Any non-secure or untrusted code has the potential to contain such malicious code. As discussed above, sandbox 104 can be used to execute non-secure or untrusted code (e.g., custom code of a user or a vendor). This untrusted code may not be (and typically would not be) secure code. To prevent any compromised code from tampering with elements of secure, processing system 116, secure processing system 116 includes an isolated sandbox 104.

As discussed above, CPU1 100 within secure processing system 116 defines sandbox 104. Sandbox 104 includes CPU2 108 and memory 106. CPU2 108 is isolated from secure processing system 116. CPU2 108 can only execute code (e.g., Java or native code) within sandbox 104. CPU2 108 therefore acts as a "real machine" (i.e., as opposed to a "virtual machine") to execute the application.

Hardware memory protection unit (HMPU) 102 is configured to enforce the isolation between CPU2 108 and secure processing system 116. HMPU 102 includes shared memory 110, I/O module 112, and static random access memory (SRAM) 114. In an embodiment, shared memory 110 of HMPU I/O module 112 and SRAM 114 are components of the secure processing system. In an embodiment, shared memory 110 is included within sandbox 104. Shared memory 110 acts as a mailbox for requests by applications executing on CPU2 108. CPU2 108 places each request in shared memory 110. Upon receipt of a request, CPU1 100 is configured to determine whether to process the request. CPU2 108 is prevented from writing executable code to shared memory 110. Rather, only non-executable requests (e.g., requests for security services) can be written to shared memory 110 by CPU2 108.

ROM 106 stores non-secure and/or uncertified code to be executed by CPU2 108 in sandbox 104. In an embodiment, some non-secure and/or uncertified code may be stored on ROM 106 during manufacture. If a user and/or vendor wants to store additional non-secure and/or uncertified code in for execution, this code can be input to shared memory 110 from open peripherals 126 using isolation bridge 124. For example, the user may opt to execute an applet (e.g., a Java applet). The operation of isolation bridge 124 is explained in greater detail below.

2.2 Secure Processing System

Secure processing system 116 includes elements within a security boundary associated with CPU1 100. For example, secure processing system 116 includes secure elements that may be accessed by code executing, on secure CPU1 100. Code executing on CPU2 108 cannot directly access the secure elements of secure processing system 116. Rather, if CPU2 108 requites the use of security services provided with in secure processing system. 116, CPU2 108 puts a request for security services in shared memory 110. This request is evaluated by CPU1 100. The process for evaluating a request for security services by CPU2 108 is explained in greater detail below with reference to FIG. 3.

In an embodiment, I/O module 112 and SRAM 114 of HMPU 102 fall within secure processing system 116. Secure processing system 116 can also include a ROM 118 accessible by secure processor CPU1 100, secure peripherals 120, security monitors 122, cryptographic processing engines 122, and isolation bridge 124. In an embodiment, ROM 118 stores secure and/or certified code. In an embodiment, elements of secure processing system 116 are only accessible by secure and/or certified code executing on CPU1 100. Security monitors 122 monitor the security of secure processing system 116 and can detect attempts to tamper with secure processing system 116. If an attack is detected, secure monitors 122 can inform CPU1 100 that an attack or attempted attack has occurred, and CPU1 100 can take action to respond to this attack. In an embodiment, secure processing system 116 has one, or more security policies. These policies may, for example, be used to define how requests (e.g., requests for security services from CPU2 108) should be handled, and which (if any) actions should be taken by the system when certain events are observed. In an embodiment, security policies can be stored in ROM 118.

2.3 Isolation Bridge

Isolation bridge 124 isolates components of secure processing system 116 from external non-secure components (e.g., open peripherals 126). Isolation bridge 124 is controlled by CPU1 100 and is configured to open and close logical or hardwired data pathways between secure processing system 116 and open peripherals 126. This isolation of open peripherals 126 prevents secure data from leaking into open peripherals 126. Further, this isolation ensures that any issues with the components of open peripherals 126 do not impact secure processing system 116. For example, this isolation may ensure that the security of secure processing system 116 cannot be compromised by open peripherals 126. By isolating open peripherals 126 from clocking information in secure processing system 116, isolation bridge 124 creates an asynchronous boundary between secure processing system 116 and open peripherals 126. This asynchronous boundary prevents non-secure elements outside of secure processing system 116 from detecting information traveling on buses within secure processing system 116.

In an embodiment, isolation bridge 124 is configured to couple two or more data pathways between secure processing system 116 and open peripherals 126. By toggling data pathways to become open and closed, isolation bridge 124 can couple and decouple elements of secure processing system 116 to open peripherals 126. For example, isolation bridge 124 may be configured to couple I/O module 112 to open peripherals 126 using a first data pathway 128. Isolation bridge 124 may be configured to couple open peripherals 126 to an encrypted bus 132 of secure processing system 116 using a second data pathway 130.

For example, if a user or a vendor wants to load non-secure and/or uncertified data onto ROM 106, the user or vendor can send a request to CPU1 100 to load this information onto shared ROM 106. CPU1 100 can determine whether to approve this request based on one or more stored security policies. If CPU1 100 approves the request, CPU1 100 can instruct isolation bridge 124 to toggle data pathway 128. After the non-secure and/or uncertified data has been transmitted to ROM 106, CPU1 100 can instruct isolation bridge to toggle data pathway 128 again to decouple open peripherals 126 from I/O module 112. Data pathway 120 can be used to transmit data from secure processing system 116 and/or ROM 106 to open peripherals 126 over encrypted bus 132. For example, if CPU1 100 approves a transfer of data from secure processing system 116 and/or ROM 106 to open peripherals 126, CPU1 100 can instruct isolation bridge 124 to toggle data pathway 128. After the non-secure and/or uncertified data has been transmitted to open peripherals 126, CPU1 100 can instruct isolation bridge to toggle data pathway 130 again to decouple open peripherals 126 from encrypted bus 132.

2.4 Cryptographic Processing Engines and Secure Peripherals

Figure 2:
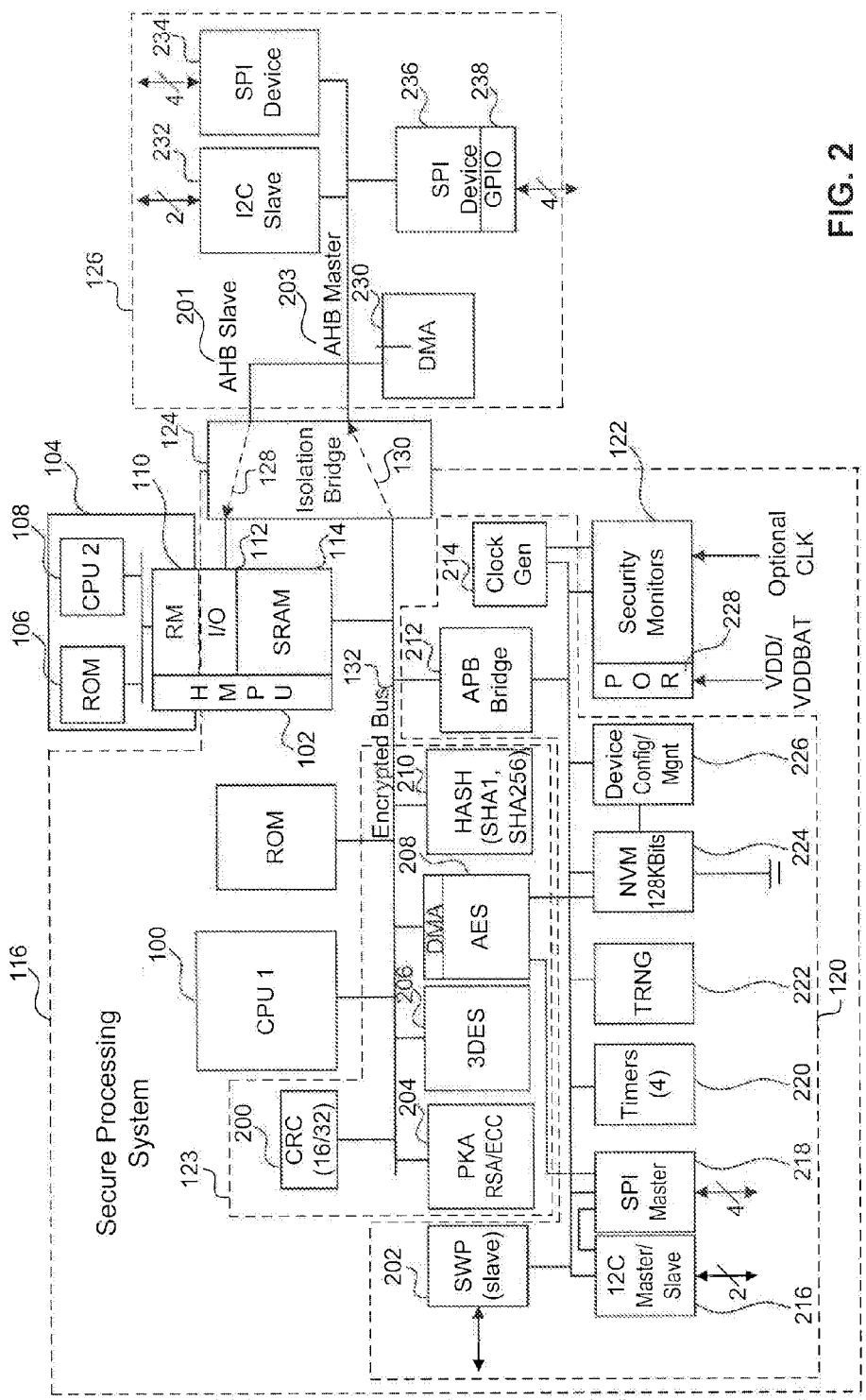
FIG. 2 is a another block diagram of a system, according to an embodiment of the present disclosure, that incorporates a secure processing system and a non-secure sandbox for execution of untrusted code.

FIG. 2 shows a more detailed diagram of a system including a secure processing system 116 and a sandbox 104 in accordance with an embodiment of the present disclosure. As illustrated in FIG. 2, open peripherals 126 may include direct memory access (DMA) module 230, inter-integrated circuit ($I^2C$) module 232, secure peripheral interface (SPI) device 234, and SPI device 236, which is shown in FIG. 2 with a general purpose input/output (GPIO) module 238. AHB Slave 201 and AHB Master 203 are buses used to connect isolation bridge 124 to these open peripherals.

Secure processing system 116 includes one or more cryptographic processing engines 123 in accordance with an embodiment of the present disclosure. For example, in FIG. 2, a cyclic redundancy check (CRC) module 200 is coupled to CPU 1 100 via encrypted bus 132. In FIG. 2, cryptographic processing engines 123 include security modules used for security services. For example, secure processing system 116 may include an asymmetric cryptography engine 204, one or more symmetric encryption engines (e.g., 3DEX 206 and/or AES 208), a cryptographic hash module 210. Embodiments may further include a stream encryption module (e.g., a RC4 module).

APB bridge 212 connects secure peripherals to CPU1 100. In an embodiment, traffic passing over this bridge is encrypted. For example, these other secure peripherals include $I^2C$ master/slave 216, SPI Master 218, non-volatile memory (NVM) 224, and device configuration and management module 226. Timers 220, timer random number generators (TRNG) 222, and a clock 213 are also coupled to CPU1 100 via APB bridge 212. In FIG. 2, a power-on-reset (POR) module 228 is coupled to security monitors 122. In an embodiment, POR module 228 detects when power is applied to the circuit implementing security monitors 122 (e.g., POR module 228 detects when the device has been reset).

2.5 Implementation

Embodiments disclosed herein advantageously allow hardware of secure processing system 116 (i.e., CPU1 100 and associated hardware) to be certified via standards such as Common Criteria. CPU2 108 is securely controlled by CPU1 100 and therefore can be allowed to run a user application within isolated sandbox 104 without losing certification of CPU1 100.

In an embodiment of the present disclosure, all elements shown in FIGS. 1 and 2 are located on the same integrated circuit (IC). In another embodiment, some elements shown in FIG. 1 and/or FIG. 2 are located on a separate IC. For example, in an embodiment, peripherals (e.g., secure peripherals 120 and/or open peripherals 126) are located on a separate IC from the rest of the elements shown in FIG. 1 and/or FIG. 2. It should be understood that any of the elements shown in FIG. 1 and/or FIG. 2 can be on the same or different IC as the IC used to implement any of the other elements shown in FIG. 1 and/or FIG. 2. In an embodiment, CPU1 100 and CPU2 108 are implemented as two separate processors. In another embodiment, CPU1 100 and CPU2 108 are implemented as two cores of a shared processor.

Embodiments of the present disclosure can be implemented in a number of devices. For example, embodiments of the present disclosure can be implemented on a mobile phone or a personal computer. These examples are provided by way of illustration and are not limiting. One of ordinary skill in the art will appreciate that a variety of possible implementations for embodiments of the present disclosure are possible.

3. Methods

Figure 3:
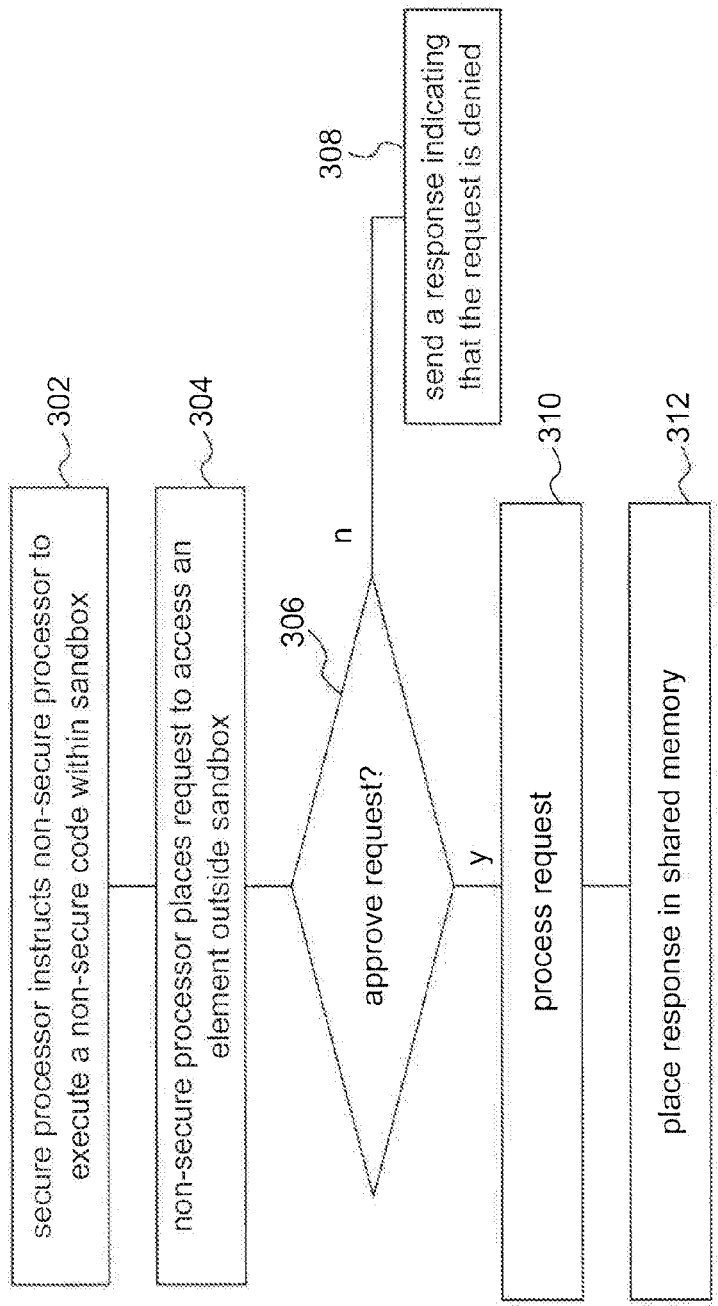
FIG. 3 is a flowchart of a method for requesting security services in accordance with embodiments of the present disclosure.

Techniques for enforcing the isolation of CPU2 108 from secure processing system 116 will now be, explained in greater detail. FIG. 3 depicts a method 300 for enforcing isolation of CPU2 108 and sandbox 104 in accordance with an embodiment of the present disclosure. Method 300 is explained with reference to the embodiments shown in FIG. 1 and FIG. 2. However, method 300 is not limited to these embodiments.

In an embodiment, CPU1 100 performs primary processing functions for all of the system elements shown in FIGS. 1 and 2. For example, CPU1 100 can be configured to execute secure, certified code for an operating system. As previously discussed, CPU1 100 does not execute non-secure and/or uncertified code. In step 302, CPU1 100 instructs CPU2 108 to process non-secure code within sandbox 104. If the non-secure code is not already loaded into shared memory 110, it may be loaded (e.g., from, open peripherals 126) into shared memory 110 at this time. Alternatively it may be loaded into another memory within sandbox 104 (e.g., into ROM 106). For example, CPU1 100 can place a command to execute the non-secure code in shared memory 110. CPU2 108 can detect this command, process the request, and (optionally) place a response in shared memory 110 after it has finished executing the non-secure code. Since shared memory 110 does not store executable code, a hacker is prevented from inserting malicious executable code into this response. CPU1 100 may read the response from shared memory 110 and may then continue processing secure code.

While CPU2 108 is processing the non-secure code, CPU2 108 may need to access elements outside sandbox 104. For example, code executing on CPU2 108 may request to hash data using cryptographic hash module 210. Because CPU2 108 is isolated from secure processing system 116, CPU2 108 cannot directly access an element outside sandbox 104. Rather, in step 304, CPU2 108 places a request to access this element in shared memory 110.

CPU1 100 detects this request and determines whether it should be approved in step 306. For example, CPU1 100 can evaluate one or more stored security policies to determine whether the request should be granted. In an embodiment, these one or more policies can be stored in ROM 118. For example, these one or more policies may state that non-secure code should not be executed if security monitors 122 detect an attack or an attempted attack by a malicious third party. One of ordinary skill in the art will appreciate that a security policy can be configured in a variety of ways. In an embodiment, a security policy can be customized and/or modified by a manufacturer or an end user.

In step 308, if CPU1 100 determines that they request should be denied, CPU1 100 sends a response to CPU2 108 (e.g., by placing a message in shared memory 110) indicating that the request is denied. If CPU1 100 approves the request, CPU1 100 processes the request in step 310. For example, CPU1 100 may instruct cryptographic hash module 210 to hash data. After the request has been processed, CPU1 100 places a response in shared memory 110 in step 312. For example, CPU1 100 may place the hashed output from cryptographic hash module 210 in shared memory 110. CPU2 108 can access this response and continue to execute code within sandbox 104.

An example of a method 300 for enforcing isolation of CPU2 108 and sandbox 104 in accordance with an embodiment of the present disclosure will now be explained with reference to FIG. 3. In step 302, CPU1 instructs CPU2 to execute non-secure code within sandbox 104. The code executing in sandbox 304 eventually generates a request to release data to a user. In step 304, CPU2 places a request to release data in shared memory 110, and CPU1 100 detects this request and determines whether to approve it in step 306. If the request is a request to release data to a secure peripheral 120 (e.g., SPI master 218), CPU1 100 grants the request because secure peripherals 120 are within the security boundary of secure processing system 116.

CPU1 100 may detect a request to release data to an open peripheral 126 (e.g., SPI device 234). In an embodiment, CPU1 100 may determine whether to grant the request based on one or more stored security policies. For example, CPU1 100 may determine to deny a request to release a stored cryptographic key to an open peripheral 126. For further example, CPU1 100 may determine to deny a request to release data to an open peripheral if security monitors 122 detect an attack or an attempted attack by a malicious third party.

If CPU1 100 denies the request, CPU1 100 sends a response indicating that access to data is denied in step 308, For example, CPU1 100 may send the response to a user via a secure peripheral 120, or CPU1 100 may instruct isolation bridge to toggle data pathway 130 so that the response can be sent to a user via an open peripheral 126. If CPU1 100 approves the request, CPU1 100 processes the request in step 310. For example, CPU1 100 may instruct isolation bridge 124 to toggle data pathway 130 so that the data can be sent to the open peripheral identified in the request. In optional step 312, CPU1 100 may place a response in shared memory 110 to inform CPU1 108 that the request was processed.

By following the procedure of FIG. 3, CPU1 100 can request execution of non-secure and/or uncertified code without compromising the security of secure processing system 116. Further, CPU2 108 can request access to an element outside sandbox 104 without compromising the security of secure processing system 116. Since CPU2 108 is isolated by hardware sandbox 104, any potential security issues with traditional Java (or native code) are avoided. In accordance with embodiments of the present disclosure, a certified secure operating system (e.g., executing on CPU1 100) is able to operate simultaneously with a non-secure application (e.g., executing on CPU2 108). Using embodiments of the present disclosure, certified secure processor CPU1 100 can respond to potential attempts to tamper with secure processing system 116 when they are detected (e.g., by security monitors 122).

4. Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing, description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
    a secure processing system, comprising:
        a shared memory,
        a secure memory configured to store a security policy, and
        a secure processor device configured to execute secure code, wherein the secure processor device is configured to determine, based on the security policy, whether to grant a request to access a secure service;
    a set of system peripherals, wherein a non-secure peripheral in the set of system peripherals is coupled to the secure processing system using an isolation bridge; and
    a first processor device physically isolated from the secure processing system and from the set of system peripherals, wherein the first processor device is configured to:
        execute code under the direction of the secure processor device, and place, in the shared memory, the request to access the secure service.

2. The system of claim 1, wherein the secure processing system further comprises a hardware protection unit configured to restrict access to the secure processing system.

3. The system of claim 2, wherein the hardware protection unit comprises the shared memory.

4. The system of claim 1, wherein the secure processor device is further configured to determine, based on the security policy, whether to instruct the isolation bridge to couple the secure processor device to the non-secure peripheral.

5. The system of claim 4, wherein the secure processor device is further configured to instruct the isolation bridge to couple the memory to the non-secure peripheral to enable loading of the code into the memory.

6. The system of claim 1, wherein the secure processing system further comprises a secure monitoring module configured to detect attempts to tamper with the secure processing system.

7. A secure processing system, comprising:
    a shared memory configured to receive a request to access a secure service from a first processor device physically isolated from the secure processing system;
    a secure memory configured to store a security policy;
    a secure processor device configured to execute secure code, wherein the secure processor device is configured to determine, based on the security policy, whether to grant the request to access the secure service;
    a set of system peripherals, wherein the first processor device is physically isolated from the set of system peripherals; and
    an isolation bridge configured to couple the secure processing system to a non-secure peripheral in the set of system peripherals.

8. The secure processing system of claim 7, wherein the first processor device is configured to execute code under the direction of the secure processor device.

9. The secure processing system of claim 7, wherein the first processor device is configured to place the request to access the secure service in the shared memory.

10. The secure processing system of claim 7, wherein the secure processing system further comprises a hardware protection unit configured to restrict access to the secure processing system.

11. The secure processing system of claim 10, wherein the hardware protection unit comprises the shared memory.

12. The system of claim 7, wherein the secure processor device is further configured to determine, based on the security policy, whether to instruct the isolation bridge to couple the secure processor device to the non-secure peripheral.

13. A method, comprising:
    placing, using a non-secure processor that is physically isolated from a secure processor, a first request for a security service in a shared memory;
    analyzing, using the secure processor, a stored security policy to determine whether to grant the first request;
    in response to determining that the first request should be granted:
        processing the first request using the secure processor, and
        placing a response in the shared memory;
    detecting a second request, the second request to release data to a system peripheral, wherein the second request is placed in the shared memory by the non-secure processor, and wherein the system peripheral is isolated from the secure processor by an isolation bridge; and
    analyzing, using the secure processor, the stored security policy to determine whether to grant the second request and
    instructing the isolation bridge to couple the non-secure processor to the system peripheral responsive to determining that the second request should be granted.

14. The method of claim 13, further comprising:
    executing, using the non-secure processor, non-secure code under the direction of the secure processor.

15. The method of claim 13, further comprising:
    receiving, from a security monitor, information indicating that an attempted attack on the secure processor has occurred; and
    determining that the second request should not be granted responsive to receiving the information.

16. The method of claim 13, further comprising:
    receiving, using the secure processor, a second request to load additional non-secure code into a non-secure memory, wherein the non-secure memory is coupled to the non-secure processor and is isolated from the secure processor; and
    determining, based on the security policy, whether to grant the third request.

* * * * *